(12) United States Patent
Kitagaki et al.

(10) Patent No.: US 11,165,293 B2
(45) Date of Patent: Nov. 2, 2021

(54) ROTOR AND MOTOR

(71) Applicant: Nidec Corporation, Kyoto (JP)

(72) Inventors: Hiroshi Kitagaki, Kyoto (JP); Takeshi Honda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 139 days.

(21) Appl. No.: 16/486,531

(22) PCT Filed: Mar. 19, 2018

(86) PCT No.: PCT/JP2018/010772
§ 371 (c)(1),
(2) Date: Aug. 16, 2019

(87) PCT Pub. No.: WO2018/180692
PCT Pub. Date: Oct. 4, 2018

(65) Prior Publication Data
US 2020/0059122 A1     Feb. 20, 2020

(30) Foreign Application Priority Data

Mar. 30, 2017   (JP) .............................. JP2017-068762

(51) Int. Cl.
*H02K 1/27* (2006.01)
*H02K 1/14* (2006.01)

(52) U.S. Cl.
CPC ............. *H02K 1/274* (2013.01); *H02K 1/145* (2013.01)

(58) Field of Classification Search
CPC .......................................... H02K 1/27–1/2793
See application file for complete search history.

(56) References Cited

U.S. PATENT DOCUMENTS 5,684,352 A    11/1997  Mita et al.
2011/0127859 A1*  6/2011  Amrhein ............... H02K 1/276
                                                    310/43
(Continued)

FOREIGN PATENT DOCUMENTS

CN    106165259 A    11/2016
JP    2003-333779 A  11/2003
(Continued)

OTHER PUBLICATIONS

Official Communication issued in International Patent Application No. PCT/JP2018/010772, dated May 15, 2018.
(Continued)

*Primary Examiner* — Thomas Truong
(74) *Attorney, Agent, or Firm* — Keating & Bennett

(57) ABSTRACT

A rotor includes a rotor core in which magnetic steel plates widening in a radial direction with respect to a central axis of the rotor core are laminated in an axial direction, and magnets provided to the rotor core. Each of the magnetic steel plates includes a base portion positioned outside the central axis in the radial direction and piece-shaped portions each spaced by a gap from an outer side in the radial direction of the base portion and arranged in a circumferential direction of the base portion at predetermined intervals. The magnets are positioned at the gaps and arranged in the circumferential direction at predetermined intervals, a length in the radial direction from a central portion of the magnet in the circumferential direction is a central portion length in a cross section perpendicular to the axial direction, a length in the radial direction from an end portion of the magnet in the circumferential direction is an end portion length, the central portion length and the end portion length are lengths in parallel or substantially in parallel, and the central portion length is greater than the end portion length.

13 Claims, 18 Drawing Sheets

(56) References Cited

U.S. PATENT DOCUMENTS

2016/0352167 A1   12/2016  Kim
2017/0085143 A1*  3/2017  Tanaka ................... H02K 1/278
2019/0214866 A1*  7/2019  Migita ................... H02K 1/276

FOREIGN PATENT DOCUMENTS

| | | |
|---|---|---|
| JP | 2005-333762 A | 12/2005 |
| JP | 2012-085433 A | 4/2012 |
| JP | 2012-085434 A | 4/2012 |
| JP | 2015-119564 A | 6/2015 |

OTHER PUBLICATIONS

Official Communication issued in corresponding Chinese Patent Application No. 201880022700.7, dated Dec. 24, 2020.

* cited by examiner

ROTOR AND MOTOR

CROSS REFERENCE TO RELATED APPLICATIONS

This is a U.S. national stage of PCT Application No. PCT/JP2018/010772, filed on Mar. 19, 2018, and priority under 35 U.S.C. § 119(a) and 35 U.S.C. § 365(b) is claimed from Japanese Application No. 2017-068762, filed Mar. 30, 2017, the entire disclosures of each application are hereby incorporated herein by reference.

1. FIELD OF THE INVENTION

The present disclosure relates to a rotor and a motor.

2. BACKGROUND

In the related art, motors are widely known in which a rotor having a so-called interior permanent magnet (IPM) structure, which is positioned at an inner side in a radial direction of an annular stator having a magnetized coil and in which magnets are provided inside a rotor core, is disposed. The plurality of magnets are arranged side by side in a circumferential direction of the rotor at predetermined intervals.

Such a motor cannot effectively utilize a magnetic flux of the magnet in regions of metal members (a magnetic steel plate) positioned between the magnets adjacent to each other in the circumferential direction.

A rotor of the conventional rotary machine includes a rotor core, a plurality of permanent magnets which are arranged on an outer peripheral surface of the rotor core in a circumferential direction, and an outer peripheral core which is provided on an outer peripheral surface of each of the plurality of permanent magnets. A wedge-shaped member for fixing the permanent magnet to the outer peripheral core is provided in an opening between the permanent magnets adjacent to each other in the circumferential direction and a set of the outer peripheral cores. With the above configuration, it is possible to suppress a leakage of a magnetic flux in regions at both sides in the circumferential direction of the permanent magnet, and it is possible to prevent the permanent magnet and the outer peripheral core from coming off.

A rotor of the conventional synchronous motor includes an inner side core portion, a plurality of permanent magnets which are arranged on an outer side in a radial direction of the inner side core portion in a circumferential direction, an outer peripheral core portion which is provided on an outer side in the radial direction of each of the plurality of permanent magnets, and a connecting portion and an outer peripheral thin portion which connect the inner side core portion and the outer peripheral core portion to a circumferential end portion of each of the permanent magnets. A fixing part formed of a non-magnetic material is inserted into one end side of the circumferential end portion of the permanent magnet without the connecting portion. With the above configuration, deformation of the rotor can be suppressed.

SUMMARY

However, in the rotor of the conventional electric rotary machine and the rotor of the conventional synchronous motor, the permanent magnets are configured in a rectangular parallelepiped shape. To this end, the wedge-shaped member or the fixing member is used. However, there is a problem in that the concern that the permanent magnets easily deviate in the circumferential direction during rotation of the rotor is not sufficiently addressed. In addition, it is necessary to additionally provide the wedge-shaped member, and thus the number of parts is increased.

One aspect of an example embodiment of the present disclosure provides a rotor including a rotor core in which a plurality of magnetic steel plates widening in a radial direction with respect to a central axis of the rotor are laminated in an axial direction, and a plurality of magnets provided to the rotor core. Each of the magnetic steel plates includes a base portion positioned outside the central axis in the radial direction, and a plurality of piece-shaped portions which are each arranged to be spaced by a gap from an outer side in the radial direction of the base portion and are arranged in a circumferential direction of the base portion at predetermined intervals. The plurality of magnets are positioned at the gaps and arranged in the circumferential direction at predetermined intervals, a length in the radial direction from a central portion of the magnet in the circumferential direction is a central portion length in a cross section perpendicular to the axial direction, a length in the radial direction from an end portion of the magnet in the circumferential direction is an end portion length, the central portion length and the end portion length are lengths in parallel or substantially in parallel, and the central portion length is greater than the end portion length.

Another aspect of the present disclosure provides a motor including the rotor with the above configuration.

The above and other elements, features, steps, characteristics and advantages of the present disclosure will become more apparent from the following detailed description of the example embodiments with reference to the attached drawings.

DETAILED DESCRIPTION

Figure 1:
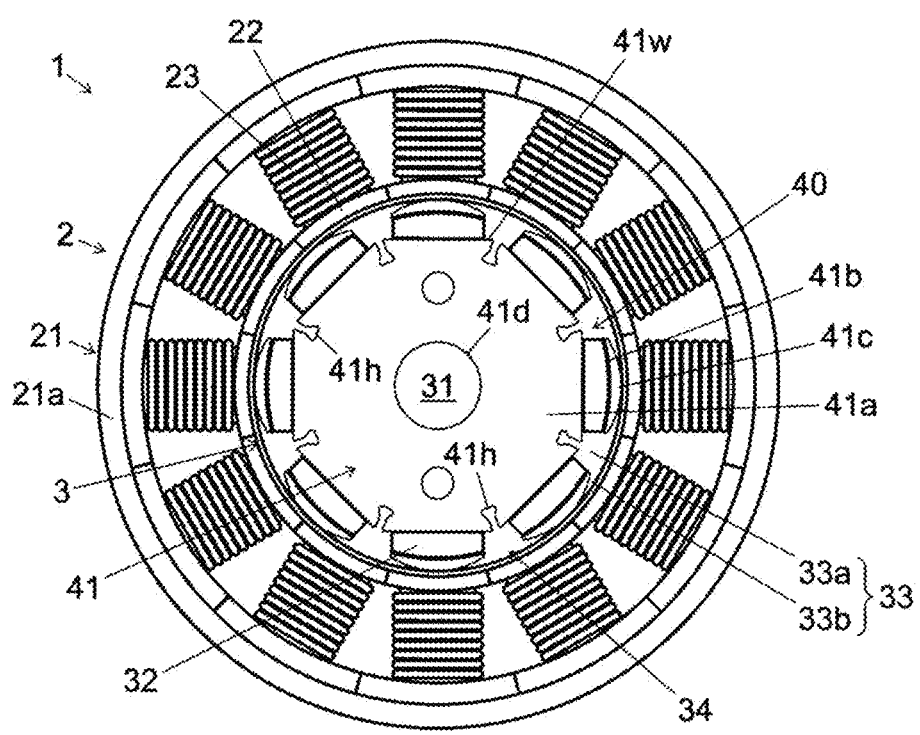
FIG. 1 is a plan view of a motor according to a first example embodiment of the present disclosure.

Hereinafter, exemplary example embodiments of the present disclosure will be described in detail with reference to the accompanying drawings. In this specification, a direction in which a rotation shaft of a motor extends is simply referred to as "an axial direction," a direction perpendicular to the rotation shaft (a direction perpendicular to the axial direction) of the motor is simply referred to as "a radial direction," and a direction along an arc about the rotation shaft of the motor is simply referred to as "a circumferential direction." A central axis of a rotor core coincides with the rotation shaft of the motor. Further, in this specification, for convenience of description, a shape and positional relationship of each portion will be described assuming that an axial direction is a vertical direction and that a depth direction of a ground in FIG. 1 is a vertical direction of a rotor core, a rotor, and a motor. Further, the definition of the vertical direction is not limited to the direction when the motor is used. Further, in this specification, a cross-section view parallel to the radial direction is referred to as "a transverse cross-section view." Further, the terms "parallel" and "vertical" used herein do not mean strictly parallel and perpendicular but include being approximately parallel and approximately perpendicular.

An overall configuration of a motor according to a first example embodiment of the present disclosure will be described. FIG. 1 is a plan view of the motor according to the example embodiment of the present disclosure. A motor 1 shown in FIG. 1 includes a stator 2 and a rotor 3.

The stator 2 has, for example, a cylindrical shape extending in an axial direction. The stator 2 is disposed on an outer side in a radial direction of the rotor 3 with a predetermined gap. The stator 2 includes a stator core 21, an insulator 22, and coils 23.

The stator core 21 has a cylindrical shape extending in the axial direction. The stator core 21 is formed by laminating a plurality of magnetic steel plates in the axial direction. The stator core 21 includes a core back 21a and teeth (not shown). The core back 21a has an annular shape. The teeth extend inward in the radial direction from an inner peripheral surface of the core back 21a. The teeth are provided in the circumferential direction at predetermined intervals.

The insulator 22 is provided to surround outer surfaces of the teeth. The insulator 22 is disposed between the stator core 21 and the coils 23. The insulator 22 is made of, for example, an insulating member such as a synthetic resin. The coils 23 are formed by winding a conductive wire around an outer periphery of the insulator 22.

The rotor 3 has a cylindrical shape extending in the axial direction. The rotor 3 is disposed on an inner side in the radial direction of the stator 2 with a predetermined gap. The rotor 3 includes a shaft 31, a rotor core 40, magnets 32, and space portions 33 or resin portions 34. The space portion 33 includes a column portion 33a and an outer peripheral portion 33b.

The shaft 31 is a rotation shaft of the motor 1. The shaft 31 has a cylindrical shape extending in a vertical direction. The shaft 31 is inserted into upper and lower bearings (both not shown) which are provided above and below the rotor 3 and is rotatably supported. The rotor 3 rotates about the shaft 31 extending in the vertical direction.

The rotor core 40 has a cylindrical shape extending in the axial direction. The shaft 31 is inserted into a hole portion 41d positioned at a central portion in the radial direction of the rotor core 40. A central axis of the rotor core 40 coincides with the shaft 31 of the motor 1. The rotor core 40 is configured, for example, by laminating a plurality of magnetic steel plates in the axial direction. Details of the rotor core 40 will be described below.

The magnets 32 are disposed on an inner side in the radial direction of an outer side edge portion of the rotor core 40. The plurality of magnets 32 are arranged side by side in the circumferential direction at predetermined intervals. For example, eight magnets 32 are provided. A length of the magnet 32 in the axial direction coincides substantially with a length of the rotor core 40 in the axial direction. The magnets 32 are attached to the rotor core 40. Details of the magnets 32 will be described below.

The column portions 33a are provided between the magnets 32 adjacent to each other in the circumferential direction. For example, when eight magnets 32 are provided, the column portions 33a are provided at eight positions. The column portion 33a has a substantially trapezoidal cross section perpendicular to the axial direction and is a quadrangular prismatic space extending in the axial direction. The column portion 33a passes through the rotor core 40 in the axial direction. By providing the column portion 33a, it is possible to more effectively utilize a magnetic flux of the magnets 32 in the rotor 3.

The outer peripheral portions 33b are provided on an outer side in the radial direction of the column portion 33a. The outer peripheral portions 33b are provided at eight positions. The outer peripheral portion 33b has a substantially semicircular cross section perpendicular to the axial direction and is a space extending in the axial direction.

The resin portions 34 are formed in the space portion 33. In an outer side edge portion of the rotor 3, the resin portion 34 is formed by causing a synthetic resin, an adhesive, or the like to flow into the space portion 33 which is surrounded by an outer side surface of the rotor core 40 and an inner peripheral surface of a mold (not shown) disposed on an outer side in the radial direction of the rotor core 40. As a result, the resin portion 34 fixes the magnet 32 and a piece-shaped portion 41c of a magnetic steel plate 41 described below to an outer side in the radial direction of a base portion 41a. Therefore, the base portion 41a and the piece-shaped portion 41c which are spaced apart from each other may be firmly fixed without using an iron material which may cause a leakage magnetic flux. Further, the resin portion 34 serves as a flux barrier.

Figure 2:
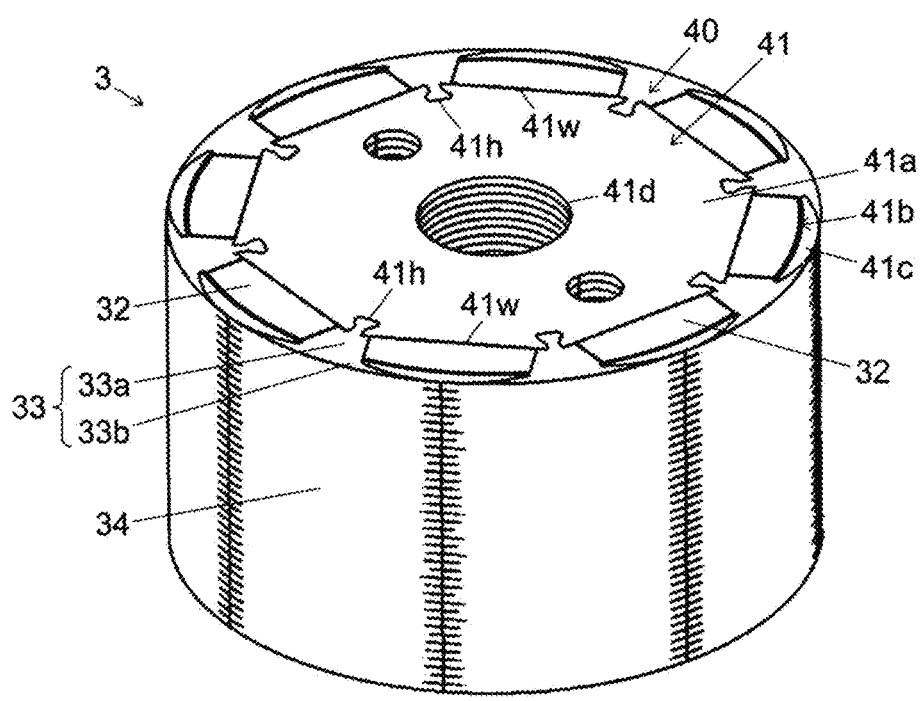
FIG. 2 is a perspective view of a rotor of the motor according to the first example embodiment of the present disclosure.
Figure 3:
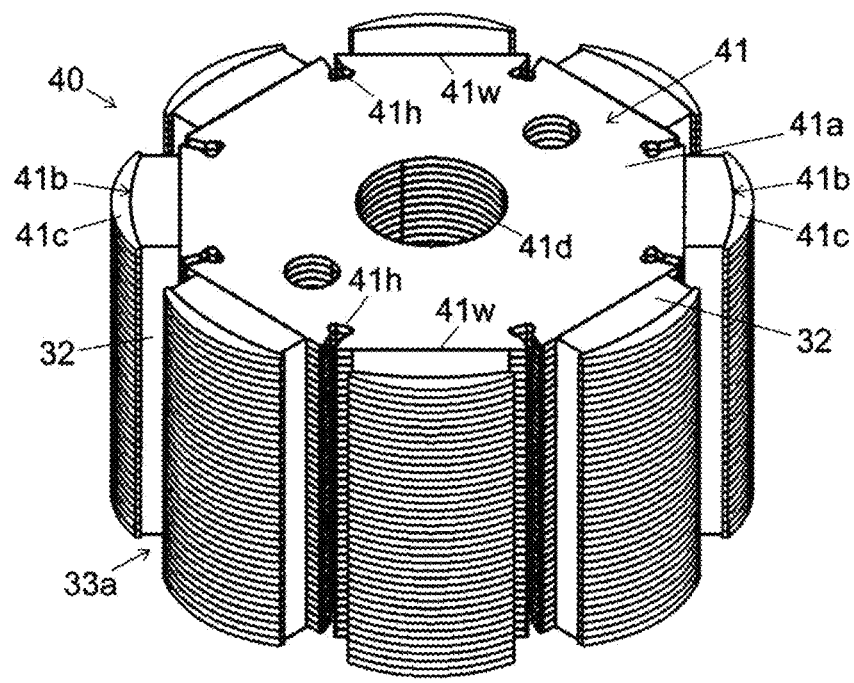
FIG. 3 is a perspective view of a rotor core and magnets of the motor according to the first example embodiment of the present disclosure.
Figure 4:
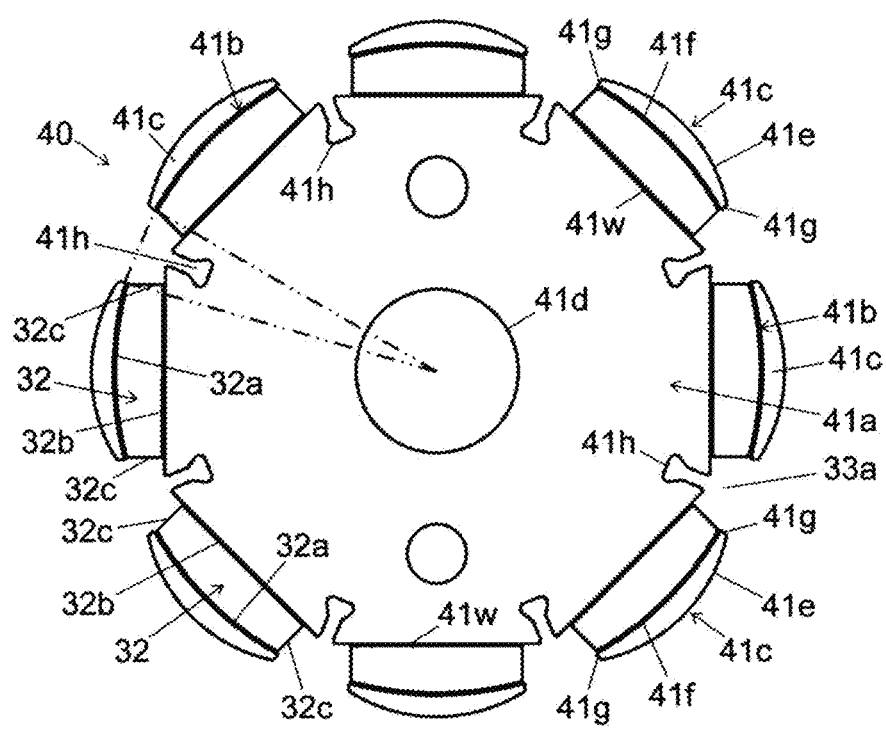
FIG. 4 is a plan view of the rotor core and the magnets of the motor according to the first example embodiment of the present disclosure.
Figure 5:
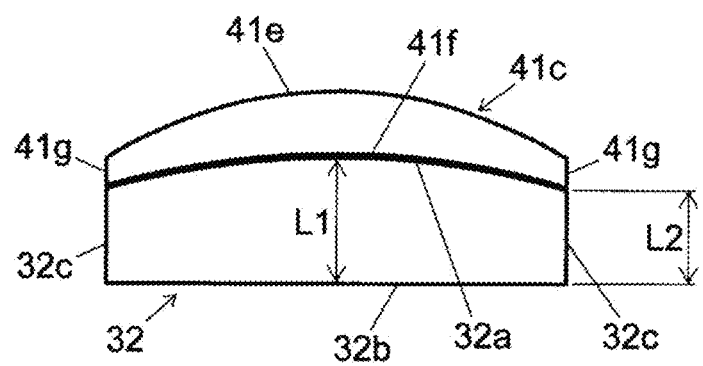
FIG. 5 is a plan view showing the magnet and a piece-shaped portion of a magnetic steel plate according to the first example embodiment of the present disclosure.

Subsequently, detailed configurations of the rotor core 40 and the magnets 32 will be described. FIG. 2 is a perspective view of the rotor 3 of the motor 1 according to the first example embodiment of the present disclosure. FIG. 3 is a perspective view of the rotor core 40 and the magnets 32 of the motor 1 according to the first example embodiment of the present disclosure. FIG. 4 is a plan view of the rotor core 40 and the magnets 32 of the motor 1 according to the first example embodiment of the present disclosure. FIG. 5 is a plan view showing the magnet 32 and the piece-shaped portion 41c of the magnetic steel plate 41 according to the first example embodiment of the present disclosure.

The rotor core 40 shown in FIGS. 2, 3, and 4 includes the magnetic steel plates 41. The magnetic steel plates 41 extend in the radial direction with respect to the central axis of the rotor core 40. The rotor core 40 is configured by laminating the plurality of magnetic steel plates 41 in the axial direction. The plurality of magnetic steel plates 41 are fixed to each other by, for example, caulking or adhesion.

The magnetic steel plate 41 shown in FIG. 4 includes the base portion 41a, gap portions 41b, and the piece-shaped portions 41c.

The base portion 41a is positioned on an outer side in the radial direction of the central axis. The base portion 41a has a substantially octagonal outer shape. The base portion 41a includes the hole portion 41d which is formed in a central portion thereof in the radial direction and through which the shaft 31 passes in the axial direction.

The gap portion 41b is formed on an outer side in the radial direction of each of eight sides of an outer side edge portion 41w of the base portion 41a. The gap portion 41b is configured as a gap between the base portion 41a and the piece-shaped portion 41c. One magnet 32 is positioned at each of the eight gap portions 41b.

The piece-shaped portions 41c are each arranged to be spaced the gap portion 41b from the outer side in the radial direction of the base portion 41a. The plurality of piece-shaped portions 41c are arranged in the circumferential direction at predetermined intervals. The piece-shaped portions 41c, for example, eight piece-shaped portions 41c, are provided on the outer sides in the radial direction of the eight sides of the outer side edge portion 41w of the base portion 41a.

As shown in FIGS. 4 and 5, the piece-shaped portion 41c includes an outer peripheral surface 41e, a piece-shaped portion inner side surface 41f, and two piece-shaped portion peripheral end surfaces 41g.

The outer peripheral surface 41e is formed close to an outer peripheral portion of the rotor core 40. The outer peripheral surface 41e is a curved surface. In the present example embodiment, the outer peripheral surface 41e is in an arc having a radius smaller than a radius of the rotor 3 having a cross section perpendicular to the axial direction, for example, a center thereof, deviating toward an outer side in the radial direction of an axial line of the shaft 31. That is, the cross section of the outer peripheral surface 41e, which is perpendicular to the axial direction, is in an arc having a curvature smaller than that of a concentric circle of the rotor 3.

The piece-shaped portion inner side surface 41f faces the magnet 32. The piece-shaped portion inner side surface 41f is a curved surface. In the present example embodiment, the piece-shaped portion inner side surface 41f is in an arc having a radius smaller than the radius of the rotor 3 having a cross section perpendicular to the axial direction, for example, a center thereof, coinciding with the axial line of the shaft 31. That is, the cross section of the piece-shaped portion inner side surface 41f, which is perpendicular to the axial direction, is in an arc having the same curvature as the concentric circle of the rotor 3.

The two piece-shaped portion peripheral end surfaces 41g face two other piece-shaped portions 41c adjacent thereto in the circumferential direction. The two piece-shaped portion peripheral end surfaces 41g are formed on both ends of the piece-shaped portion 41c in the circumferential direction. The two piece-shaped portion peripheral end surfaces 41g are flat surfaces and are in parallel. Further, the piece-shaped portion peripheral end surfaces 41g are parallel to a cross section of the piece-shaped portion 41c, which crosses a center of the rotor and extends in the axial direction, at a central portion of the piece-shaped portion 41c in the circumferential direction.

The base portion 41a includes concave portions 41h. The piece-shaped portion 41c faces other piece-shaped portions 41c adjacent thereto in the circumferential direction. The concave portion 41h is formed in an angle region between the piece-shaped portions 41c adjacent to each other in the circumferential direction with respect to the central axis. Therefore, the concave portion 41h is formed in a fan-shaped region which is surrounded by end portions of each of the piece-shaped portions 41c adjacent to each other in the circumferential direction and the central axis. That is, the concave portion 41h is formed in the column portion 33a of the rotor 3. An example of the angle region is indicated by a dash double-dotted line in FIG. 4.

The concave portion 41h is recessed inward in the radial direction from the outer side edge portion 41w of the base portion 41a. When the base portion 41a is polygonal, the concave portion 41h is recessed inward in the radial direction from respective apexes of the base portion 41a. The base portion 41a includes the concave portion 41h so that it is possible to secure a wide magnetic gap between the other magnets 32 adjacent to each other in the circumferential direction. As a result, it is possible to effectively suppress occurrence of a leakage magnetic flux from the end portion in the circumferential direction of the magnet 32. Further, after the magnet 32 is inserted into the gap portion 41b, a synthetic resin, an adhesive, or the like enters the concave portion 41h when the synthetic resin, the adhesive, or the like flows to the outer side in the radial direction of the base portion 41a. As a result, the piece-shaped portion 41c and the magnet 32 may be firmly fixed.

As shown in FIGS. 4 and 5, the magnet 32 includes an outer side surface 32a, an inner side surface 32b, and two peripheral end surfaces 32c.

The outer side surface 32a faces the piece-shaped portion 41c of the magnetic steel plate 41. The outer side surface 32a is a curved surface. The outer side surface 32a is in an arc having a radius smaller than the radius of the rotor 3 having a cross section perpendicular to the axial direction, for example, a center thereof, coinciding with the axial line of the shaft 31.

The inner side surface 32b faces the base portion 41a of the magnetic steel plate 41. The inner side surface 32b is a flat surface. The inner side surface 32b is in a straight line of which a cross section perpendicular to the axial direction extends along, for example, eight sides of the outer side edge portion 41w of the base portion 41a.

The two peripheral end surfaces 32c face two other magnets 32 adjacent thereto in the circumferential direction. The two peripheral end surfaces 32c are flat surfaces and are in parallel. That is, the peripheral end surfaces 32c are parallel to a cross section of the magnet 32, which crosses the center of the rotor and extends in the axial direction, at a central portion of the magnet 32 in the circumferential direction.

In the cross section perpendicular to the axial direction, a length in the radial direction at the central portion of the magnet 32 in the circumferential direction is referred to as a central portion length L1, and a length in the radial direction at an end portion of the magnet 32 in the circumferential direction is referred to as an end portion length L2. In this case, the central portion length L1 and the end portion length L2 are lengths in directions in parallel. Further, the central portion length L1 is greater than the end portion length L2.

With the above configuration, since the shape of the magnet 32 viewed from the axial direction is a shape which is convex outward in the radial direction at the central portion in the circumferential direction, it is possible to prevent deviation of the magnet 32 in the circumferential direction. Further, with the above configuration, a volume of the magnet 32 may be increased without increasing a diameter of the rotor 3. As a result, it possible to increase an amount of magnetic flux.

Further, when the magnet 32 has the above-described shape, the magnet 32 having a large amount of magnetic flux may be obtained through easy processing. Further, since the two peripheral end surfaces 32c of the magnet 32 are in parallel, it is possible to secure a magnetic gap between the flat surfaces and other magnets 32 adjacent to each other in the circumferential direction. As a result, it is possible to suppress occurrence of a leakage magnetic flux from the end portion of the magnet 32 in the circumferential direction, and it is possible to effectively utilize an interlinkage magnetic flux extending from the rotor 3 toward the stator 2.

Further, the piece-shaped portion inner side surface 41f which is a surface facing the magnet 32 is a curved surface. Therefore, it is possible to reduce a usage amount of the iron material serving as the piece-shaped portion 41c. As a result, even when being influenced by a flux-weakening field of stator 2, it is possible to suppress a change of an induced voltage waveform and suppress an increase of torque ripple which is torque fluctuation generated during rotation of the rotor 3. In particular, distortion is likely to occur in the induced voltage waveform when an advancing angle of weak flux control increases. However, with the above configuration, the occurrence of such distortion may be suppressed.

Further, since the piece-shaped portion peripheral end surfaces 41g of the piece-shaped portion 41c are flat surfaces, the peripheral end surface 32c of the magnet 32 and the piece-shaped portion peripheral end surface 41g of the piece-shaped portion 41c may have the same height (see FIG. 5). As a result, a magnetic gap may be secured between other piece-shaped portions 41c adjacent to each other in the circumferential direction. As a result, it is possible to suppress occurrence of a leakage magnetic flux from the end portion of the magnet 32 in the circumferential direction, and it is possible to effectively utilize an interlinkage magnetic flux extending from the rotor 3 toward the stator 2.

In the cross section perpendicular to the axial direction, when the central portion length L1 is greater than the end portion length L2, the magnet 32 and the piece-shaped portion 41c of the magnetic steel plate 41 may have different configurations. For example, modifications described below are considered.

Figure 6:
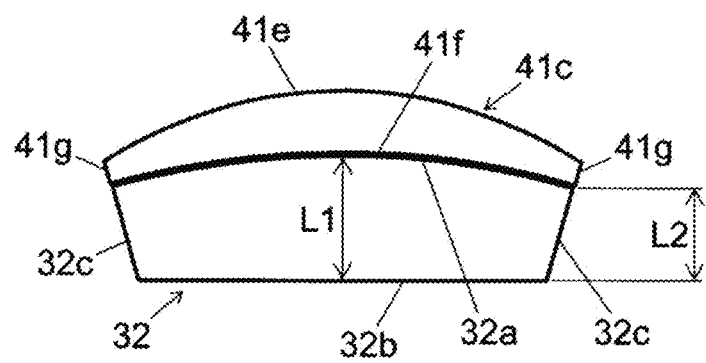
FIG. 6 is a plan view of a first modification of the magnet and the piece-shaped portion of the magnetic steel plate according to the first example embodiment of the present disclosure.

FIG. 6 is a plan view of a first modification of the magnet 32 and the piece-shaped portion 41c of the magnetic steel plate 41 according to the first example embodiment of the present disclosure. For example, as shown in FIG. 6, two peripheral end surfaces 32c formed on both ends of the magnet 32 may each be a flat surface which crosses the center of the rotor and extends in the axial direction. In this case, two piece-shaped portion peripheral end surfaces 41g formed on both ends of the piece-shaped portion 41c may also each be a flat surface which crosses the center of the rotor and extends in the axial direction. As a result, the peripheral end surfaces 32c of the magnet 32 and the piece-shaped portion peripheral end surfaces 41g of the piece-shaped portion 41c may have the same height.

Figure 7:
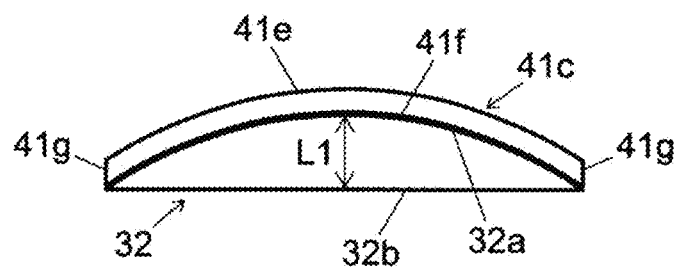
FIG. 7 is a plan view of a second modification of the magnet and the piece-shaped portion of the magnetic steel plate according to the first example embodiment of the present disclosure.

FIG. 7 is a plan view of a second modification of the magnet 32 and the piece-shaped portion 41c of the magnetic steel plate 41 according to the first example embodiment of the present disclosure. For example, as shown in FIG. 7, no peripheral end surface may be present in the configuration. That is, in a cross section perpendicular to the axial direction, the magnet 32 has a substantially semicircular shape having an arc with a radius smaller than that of the rotor 3 and a straight portion corresponding to a chord positioned on an inner side in the radial direction of the arc. As shown in FIG. 7, two piece-shaped portion peripheral end surfaces 41g formed on both ends of the piece-shaped portion 41c may be flat surfaces extending in parallel or may each be a flat surface which crosses the center of the rotor and extends in the axial direction.

Figure 8:
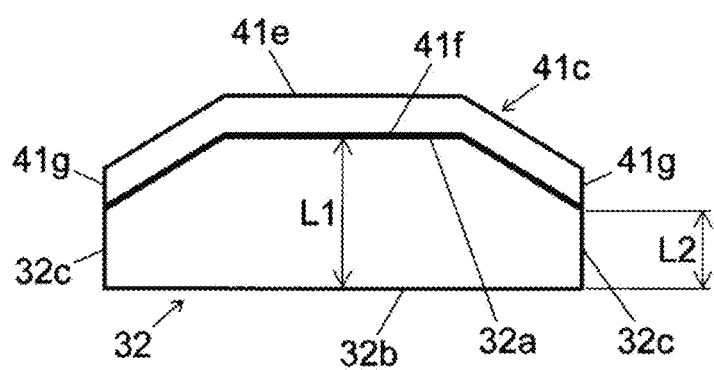
FIG. 8 is a plan view of a third modification of the magnet and the piece-shaped portion of the magnetic steel plate according to the first example embodiment of the present disclosure.

FIG. 8 is a plan view of a third modification of the magnet 32 and the piece-shaped portion 41c of the magnetic steel plate 41 according to the first example embodiment of the present disclosure. For example, as shown in FIG. 8, an outer side surface 32a may have a configuration in which a plurality of flat surfaces are connected. The outer side surface 32a includes, for example, three flat surfaces, and a flat surface of a central portion is parallel to an inner side surface 32b. Two other flat surfaces formed on both ends of the flat surface of the central portion of the outer side surface 32a are inclined inward in the radial direction and connected to the peripheral end surface 32c. That is, in the cross section perpendicular to the axial direction, the magnet 32 is hexagonal. The peripheral end surfaces 32c are parallel to the cross section of the magnet 32, which crosses the center of the rotor and extends in the axial direction, at the central portion of the magnet 32 in the circumferential direction.

Each of the outer peripheral surface 41e and the piece-shaped portion inner side surface 41f includes three flat surfaces like the outer side surface 32a of the magnet 32. Two piece-shaped portion peripheral end surfaces 41g are parallel to a cross section of the piece-shaped portion 41c, which crosses the center of the rotor and extends in the axial direction, at the central portion of the piece-shaped portion 41c in the circumferential direction. The peripheral end surfaces 32c and the piece-shaped portion peripheral end surfaces 41g may have the same height.

Figure 9:
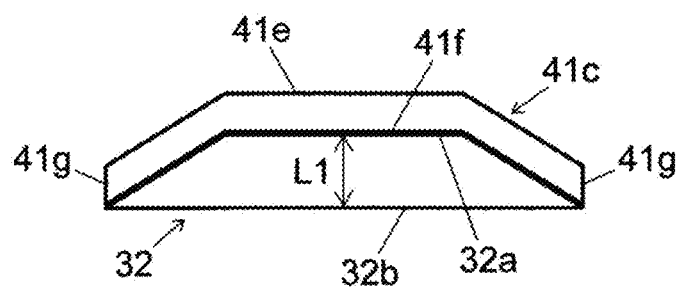
FIG. 9 is a plan view of a fourth modification of the magnet and the piece-shaped portion of the magnetic steel plate according to the first example embodiment of the present disclosure.

FIG. 9 is a plan view of a fourth modification of the magnet 32 and the piece-shaped portion 41c of the magnetic steel plate 41 according to the first example embodiment of the present disclosure. For example, as shown in FIG. 9, an outer side surface 32a includes three flat surfaces, and two peripheral end surfaces may not be present in the configuration. In the magnet 32, both end portions of the outer side surface 32a in the circumferential direction configured with three flat surfaces are connected to both end portions of an inner side surface 32b in the circumferential direction configured with a single flat surface. That is, the magnet 32 has a quadrangular cross section perpendicular to the axial direction.

Each of the outer peripheral surface 41e and the piece-shaped portion inner side surface 41f includes three flat surfaces like the outer side surface 32a of the magnet 32. As shown in FIG. 9, two piece-shaped portion peripheral end surfaces 41g may be flat surfaces extending in parallel or may each be a flat surface which crosses the center of the rotor and extends in the axial direction.

Figure 10:
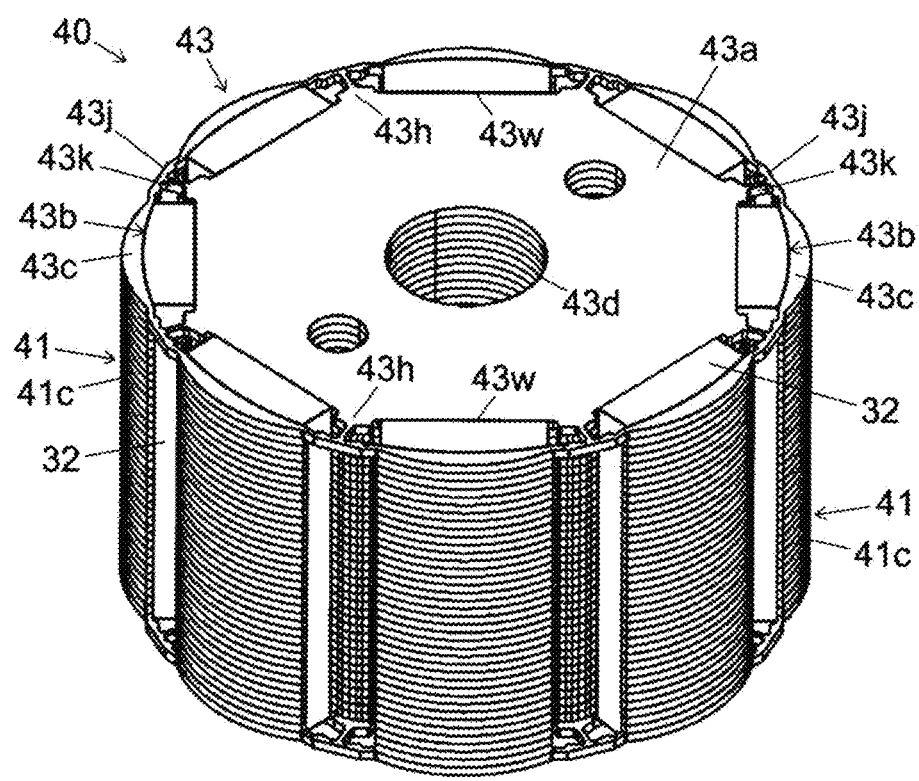
FIG. 10 is a perspective view of a rotor core and magnets of a motor according to a second example embodiment of the present disclosure.
Figure 11:
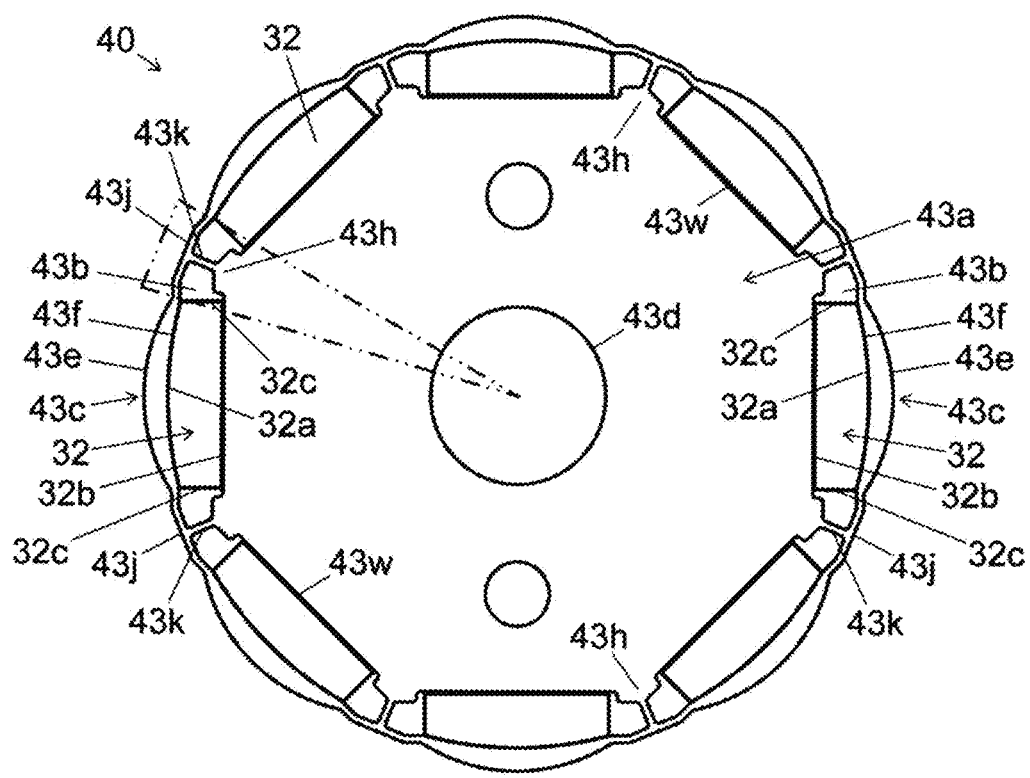
FIG. 11 is a plan view of the rotor core and the magnets of the motor according to the second example embodiment of the present disclosure.

Next, a motor according to a second example embodiment of the present disclosure will be described. FIG. 10 is a perspective view of a rotor core and magnets of the motor according to the second example embodiment of the present disclosure. FIG. 11 is a plan view of the rotor core and the magnets of the motor according to the second example embodiment of the present disclosure. Further, since a basic configuration of the example embodiment is the same as that of the first example embodiment described above, components which are common to those of the first example embodiment are denoted by the same reference numerals or the same names, and descriptions thereof may be omitted.

A rotor core 40 shown in FIGS. 10 and 11 further includes connection magnetic steel plates 43 in addition to magnetic steel plates 41. The connection magnetic steel plates 43 expand in the radial direction with respect to a central axis of the rotor core 40 in the same manner as the magnetic steel plates 41.

The connection magnetic steel plate 43 shown in FIG. 11 includes a base portion 43a, gap portions 43b, piece-shaped portions 43c, connection portions 43j, and connecting portions 43k. The base portion 43a, the gap portion 43b and the piece-shaped portion 43c have the same outer shape as a base portion 41a, a gap portion 41b, and a piece-shaped portion 41c of a magnetic steel plate 41 and overlap the base portion 41a, the gap portion 41b, and the piece-shaped portion 41c of the magnetic steel plate 41 in the axial direction.

The base portion 43a is positioned outside a central axis in the radial direction. The base portion 43a includes a hole portion 43d which is formed in a the central portion in the radial direction and through which a shaft 31 passes in the axial direction.

The base portion 43a has convex portions 43h. The piece-shaped portion 43c faces piece-shaped portions 43c adjacent thereto in the circumferential direction. The convex portion 43h is formed in an angle region between the piece-shaped portions 43c adjacent to each other in the circumferential direction with respect to the central axis. That is, the convex portion 43h is formed in a fan-shaped region which is surrounded by end portions of each of the piece-shaped portions 43c adjacent to each other in the circumferential direction and the central axis. In other words, the convex portion 43h is formed in the column portion 33a of the rotor 3. When the base portion 43a is polygonal, the convex portion 43h protrudes toward an outer side in the radial direction from respective apexes of the base portion 43a. An example of the angle region is indicated by a dash double dotted line in FIG. 11.

The gap portion 43b is formed on an outer side in the radial direction of each of eight sides of an outer side edge portion 43w of the base portion 43a. The gap portion 43b is configured as a gap between the base portion 43a and the piece-shaped portion 43c. One magnet 32 is positioned at each of the eight gap portions 43b.

The piece-shaped portions 43c are each arranged to be spaced the gap portion 43b from the outer side of the base portion 43a in the radial direction. The plurality of piece-shaped portions 43c are arranged in the circumferential direction at predetermined intervals. The piece-shaped portions 43c, for example, eight piece-shaped portions 43c, are provided on the outer side in the radial direction of the eight sides of the outer side edge portion 43w of the base portion 43a.

The piece-shaped portion 43c includes an outer peripheral surface 43e and a piece-shaped portion inner side surface 43f. The end portion in the circumferential direction of the piece-shaped portion 43c is connected to the connection portion 43j.

The connection portions 43j are arranged in regions between the piece-shaped portions 43c adjacent to each other in the circumferential direction and present in a total of eight positions. The connection portion 43j has a long plate shape extending in the circumferential direction. The connection portion 43j connects the piece-shaped portions 43c adjacent to each other in the circumferential direction. The piece-shaped portions 43c and the connection portions 43j are alternately arranged in the circumferential direction so as to form an annular shape.

The connecting portions 43k are arranged in regions between the base portion 43a and the connection portions 43j which are spaced apart from each other in the radial direction. The connecting portions 43k are arranged in the circumferential direction at predetermined intervals. The connecting portion 43k is arranged in a region between gap portions 43b adjacent to each other in the circumferential direction. That is, the connecting portion 43k is provided in the column portion 33a of the rotor 3. The connecting portion 43k has a long plate shape extending in the radial direction. The connecting portion 43k connects the base portion 43a to the connection portion 43j. More specifically, the connecting portion 43k connects a front end portion in the radial direction of the convex portion 43h to an inner side edge portion in the radial direction of the connection portion 43j.

In the rotor core 40 shown in FIGS. 10 and 11, for example, one connection magnetic steel plate 43 is disposed at each of upper and lower ends in the axial direction. In this case, the piece-shaped portion 41c of the magnetic steel plate 41 and the piece-shaped portion 43c of the connection magnetic steel plate 43 overlap in the axial direction. The magnetic steel plate 41 and the connection magnetic steel plate 43 are laminated at a position at which portions of outer side edge portions of the magnetic steel plate 41 and the connection magnetic steel plate 43 are aligned. The magnetic steel plate 41 and the connection magnetic steel plate 43 are fixed to each other by, for example, adhesion.

Accordingly, in the rotor core 40 of the second example embodiment, the magnetic steel plate 41 without the connection portion 43j and the connecting portion 43k, and the connection magnetic steel plate 43 having the connection portion 43j and the connecting portion 43k are laminated. With the above configuration, the smallest amount of iron material possible may be used as the connecting portion 43k, and the base portion 41a and the piece-shaped portion 41c of the magnetic steel plate 41, which are spaced apart from each other, may be fixed. As a result, a magnetic gap due to the column portion 33a may be widely used, and occurrence of a leakage magnetic flux may be suppressed.

Further, the connection magnetic steel plate 43 may be disposed only at either the upper end or the lower end of the rotor core 40 in the axial direction. Further, the connection magnetic steel plate 43 may be disposed on a central portion of the rotor core 40 in the axial direction.

Figure 12:
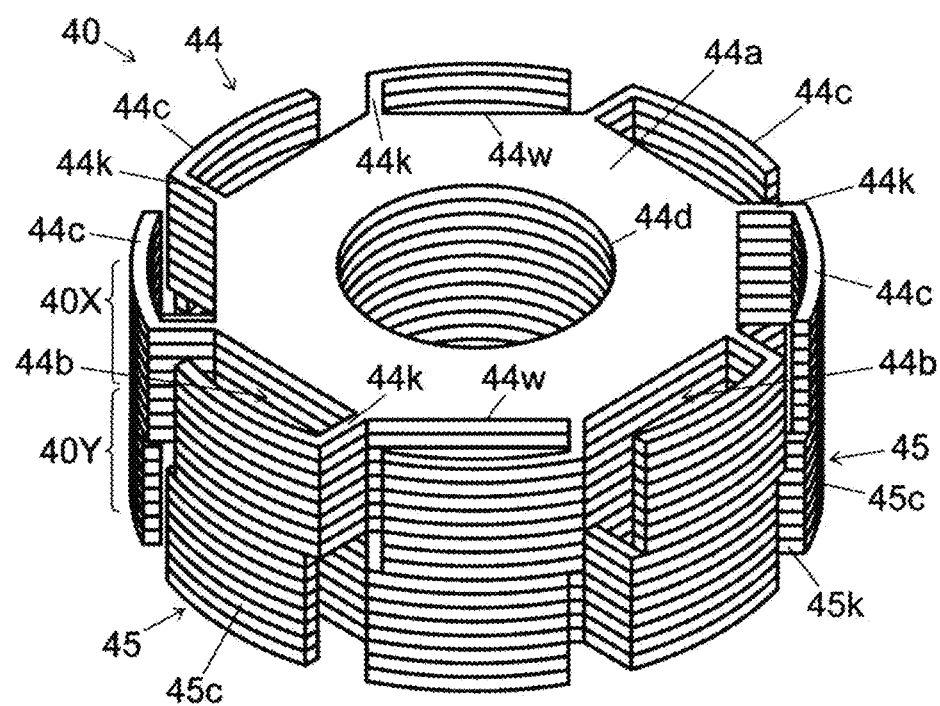
FIG. 12 is a perspective view of a rotor core of a motor according to a third example embodiment of the present disclosure.
Figure 13:
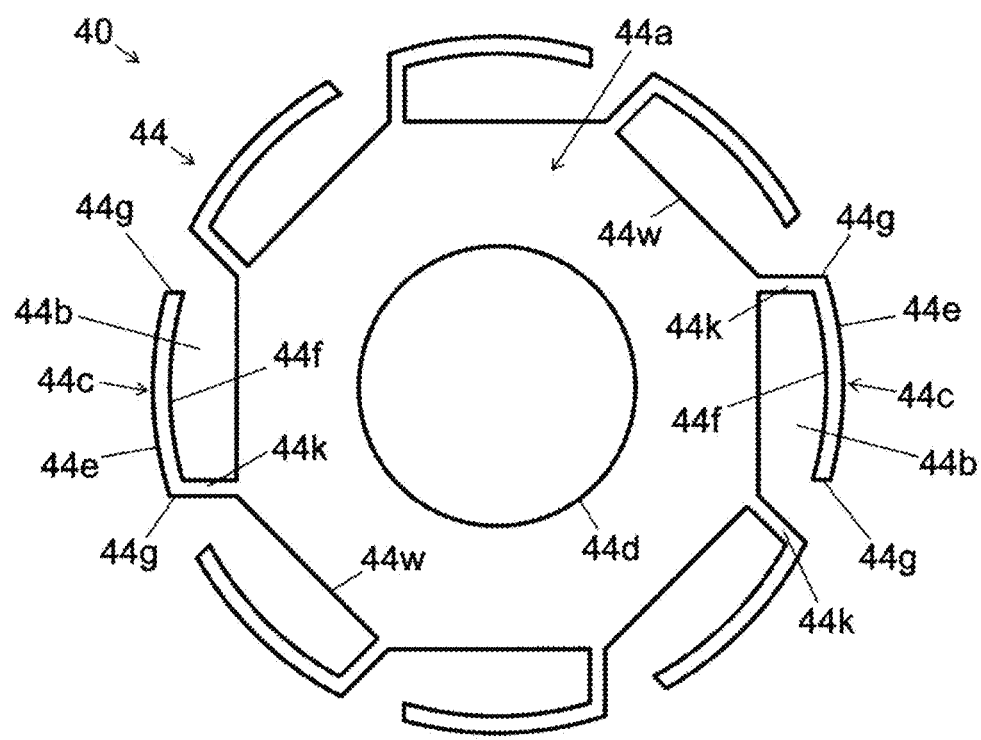
FIG. 13 is a transverse cross-section view of the rotor core of the motor when viewed from above according to the third example embodiment of the present disclosure.
Figure 14:
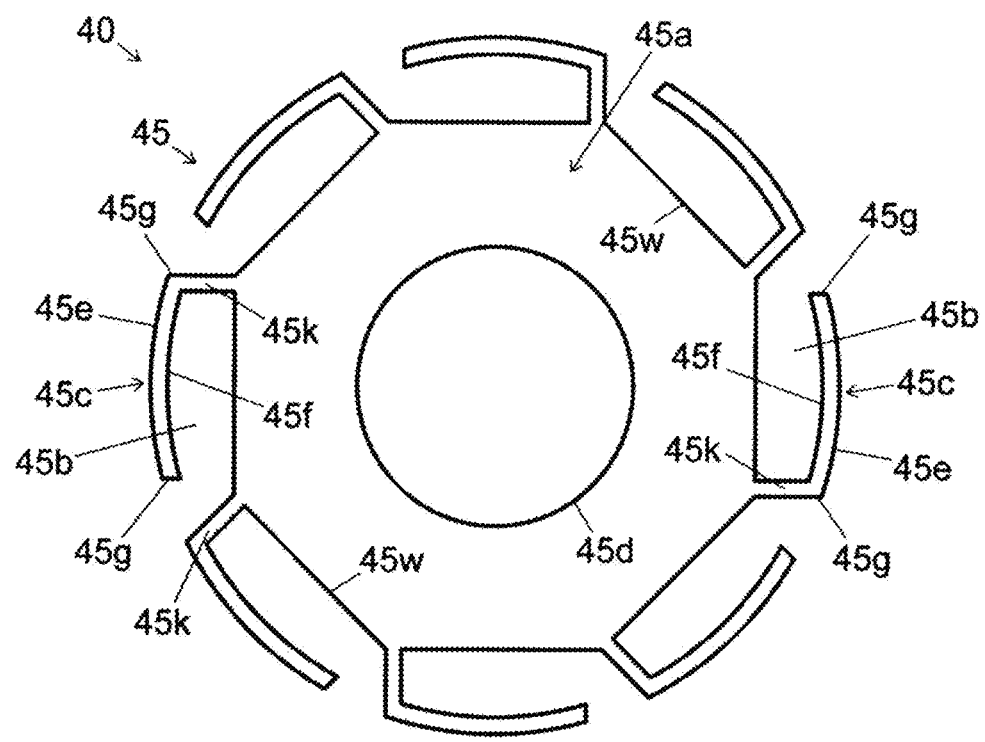
FIG. 14 is a transverse cross-section view of the rotor core of the motor when viewed from below according to the third example embodiment of the present disclosure.

Next, a motor according to a third example embodiment of the present disclosure will be described. FIG. 12 is a perspective view of a rotor core of the motor according to the third example embodiment of the present disclosure. FIG. 13 is a transverse cross-section view of the rotor core of the motor when viewed from above according to the third example embodiment of the present disclosure. FIG. 14 is a transverse cross-section view of the rotor core of the motor when viewed from below according to the third example embodiment of the present disclosure. Further, since a basic configuration of the example embodiment is the same as that of the first or second example embodiment described above, components which are common to those of the first or second example embodiment are denoted by the same reference numerals or the same names, and descriptions thereof may be omitted.

A rotor core 40 shown in FIGS. 12, 13, and 14 includes connection magnetic steel plates 44 and 45. The connection magnetic steel plates 44 and 45 expand in the radial direction with respect to a central axis of the rotor core 40.

The connection magnetic steel plate 44 shown in FIG. 13 includes a base portion 44a, gap portions 44b, piece-shaped portions 44c, and connecting portions 44k. Since the base portion 44a and the gap portion 44b have the same configuration as that of the first or second example embodiment, descriptions thereof will be omitted here.

The piece-shaped portion 44c includes an outer peripheral surface 44e, a piece-shaped portion inner side surface 44f, and two piece-shaped portion peripheral end surfaces 44g. The outer peripheral surface 44e and the piece-shaped portion inner side surface 44f are in concentric circular arcs having a cross section perpendicular to the axial direction, for example, a center thereof, coinciding with an axial line of a shaft 31. The two piece-shaped portion peripheral end surfaces 44g are flat surfaces and are in parallel. That is, the piece-shaped portion peripheral end surfaces 44g are parallel to a cross section of the piece-shaped portion 44c, which crosses a center of the rotor and extends in the axial direction, at a central portion of the piece-shaped portion 44c in the circumferential direction.

The connecting portions 44k are arranged in regions between the base portion 44a and the piece-shaped portions 44c with respect to the radial direction. The connecting portions 44k are arranged in the circumferential direction at predetermined intervals. The connecting portion 44k is disposed in a region between the gap portions 44b adjacent to each other in the circumferential direction. The connecting portions 44k are parallel to the cross section of the piece-shaped portion 44c, which crosses a center of the rotor and extends in the axial direction, at the central portion of the piece-shaped portion 44c in the circumferential direction. The connecting portion 44k has a long plate shape extending in the radial direction.

The connecting portion 44k connects an end portion in the circumferential direction at one side of the piece-shaped portion 44c to the base portion 44a. More specifically, in FIG. 13, the connecting portion 44k is disposed between the gap portions 44b on a clockwise side and connects the end portion in the circumferential direction at one side of the piece-shaped portion 44c to the base portion 44a. As shown in FIG. 13, the piece-shaped portion 44c and the connecting portion 44k which are connected to each other have a shape having an L-shaped cross section perpendicular to the axial direction.

The connection magnetic steel plates 45 shown in FIG. 14 include a base portion 45a, gap portions 45b, piece-shaped portions 45c, and connecting portions 45k. Since the connection magnetic steel plates 45 have the same structure except that the front and back of the connection magnetic steel plates 44 are reversed, detailed descriptions thereof will be omitted.

In FIG. 14, the connecting portion 45k of the connection magnetic steel plate 45 is disposed between the gap portions 45b on a counterclockwise side and connects an end portion in the circumferential direction at one side of the piece-shaped portion 45c to the base portion 45a. As shown in FIG. 14, the piece-shaped portion 45c and the connecting portion 45k which are connected to each other have a shape having an L-shaped cross section perpendicular to the axial direction.

In the rotor core 40 shown in FIGS. 12, 13, and 14, a first laminate 40X on an upper side and a second laminate 40Y on a lower side are laminated. In the first laminate 40X, a plurality of connection magnetic steel plates 44 having the connecting portion 44k at one end side in the circumferential direction of the piece-shaped portion 44c are laminated. In the second laminate 40Y, a plurality of connection magnetic steel plates 45 having the connecting portion 45k at another end side in the circumferential direction of the piece-shaped portion 45c are laminated.

Further, in the rotor core 40, at least one of the plurality of magnetic steel plates may be the connection magnetic steel plate 44 having the connecting portion 44k at one end side in the circumferential direction of the piece-shaped portion 44c, and at least one of the plurality of magnetic steel plates may be the connection magnetic steel plate 45 having the connecting portion 45k at another end side in the circumferential direction of the piece-shaped portion 45c.

With the above configuration, it is possible to appropriately maintain a position of the magnet 32 in the circumferential direction even when a rotation direction of the rotor 3 is set to either forward rotation or reverse rotation. Further, since an amount of iron material used as the connecting portions 44k and 45k is relatively small, it can be expected that a leakage magnetic flux is suppressed.

Further, since the rotor core 40 is formed by laminating the first laminate 40X and the second laminate 40Y in which the plurality of connection magnetic steel plates having the same shape are laminated, the formation of the rotor 3 is facilitated.

Further, the rotor core 40 may be configured by laminating three laminates in which a plurality of connection magnetic steel plates having the same shape are laminated.

Figure 15:
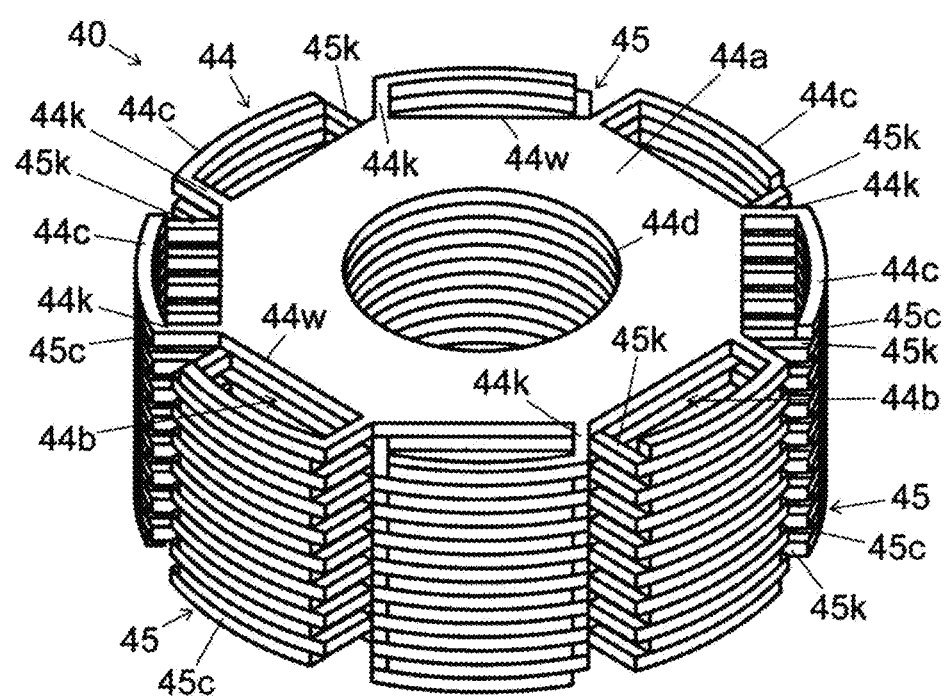
FIG. 15 is a perspective view of a modification of the rotor core of the motor according to the third example embodiment of the present disclosure.

FIG. 15 is a perspective view of a modification of a rotor core of a motor according to a third example embodiment of the present disclosure. In a rotor core 40 shown in FIG. 15, connection magnetic steel plates 44 having a connecting portion 44k at one end side in the circumferential direction of a piece-shaped portion 44c and connection magnetic steel plates 45 having a connecting portion 45k at another end side in the circumferential direction of a piece-shaped portion 45c are alternately laminated. With the above configuration, since both end portions in the circumferential direction of the magnet 32 face the connecting portions 44k and 45k in the circumferential direction for each magnetic steel plate, it is possible to appropriately maintain a position of the magnet 32 in the circumferential direction.

Figure 16:
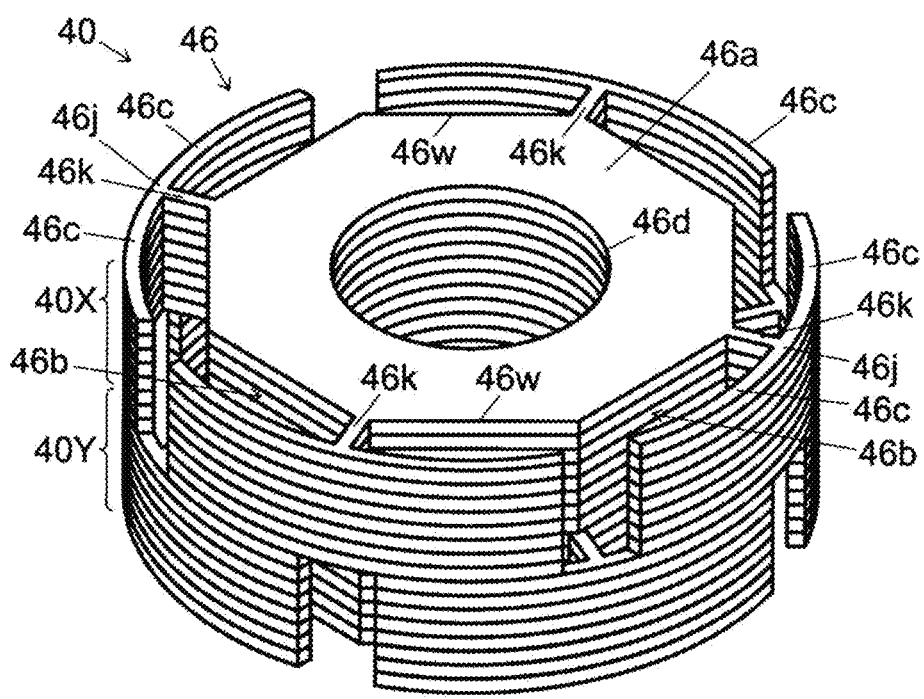
FIG. 16 is a perspective view of a rotor core of a motor according to a fourth example embodiment of the present disclosure.
Figure 17:
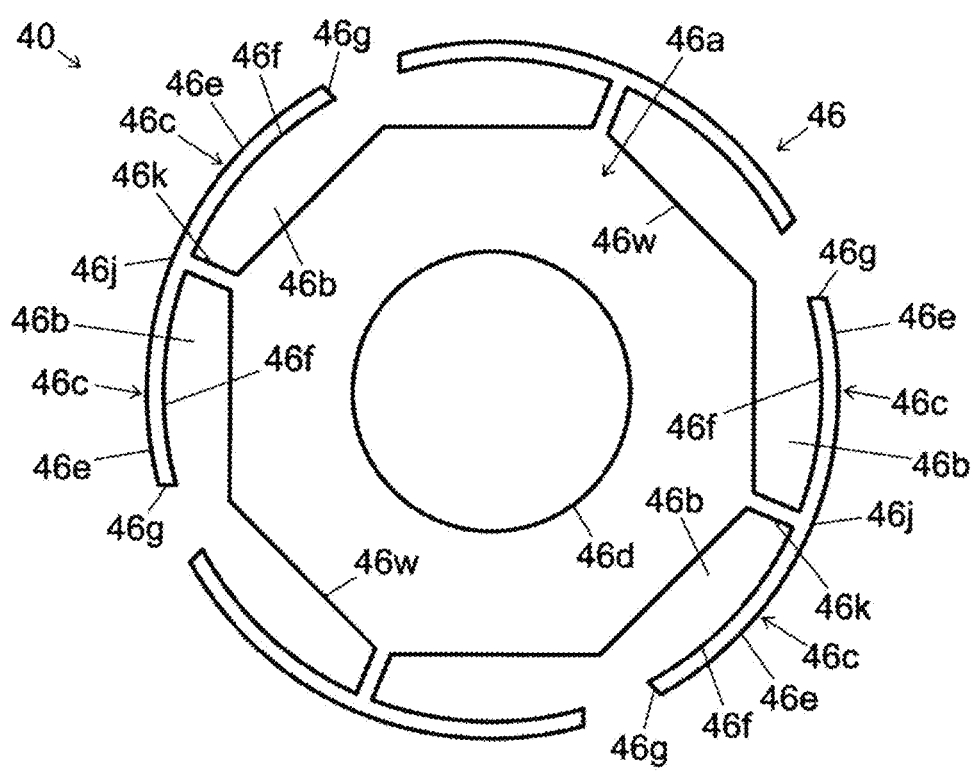
FIG. 17 is a transverse cross-section view of the rotor core of the motor when viewed from above according to the fourth example embodiment of the present disclosure.

A motor according to a fourth example embodiment of the present disclosure will be described. FIG. 16 is a perspective view of a rotor core of the motor according to the fourth example embodiment of the present disclosure. FIG. 17 is a transverse cross-section view of the rotor core of the motor when viewed from above according to the fourth example embodiment of the present disclosure. Further, since a basic configuration of the example embodiment is the same as that of the first, second, or third example embodiment described above, components which are common to those of the first, second, or third example embodiment are denoted by the same reference numerals or the same names, and descriptions thereof may be omitted.

A rotor core 40 shown in FIGS. 16 and 17 includes connection magnetic steel plates 46. The connection magnetic steel plates 46 expand in the radial direction with respect to a central axis of the rotor core 40.

The connection magnetic steel plate 46 shown in FIG. 17 includes a base portion 46a, gap portions 46b, piece-shaped portions 46c, connection portions 46j, and connecting portions 46k. Since the base portion 46a and the gap portion 46b have the same configuration as those of the first, second, or third example embodiment, descriptions thereof will be omitted here.

The piece-shaped portion 46c includes an outer peripheral surface 46e, a piece-shaped portion inner side surface 46f, and a single piece-shaped portion peripheral end surface 46g. The outer peripheral surface 46e and the piece-shaped portion inner side surface 46f are in concentric circular arcs having a cross section perpendicular to the axial direction, for example, a center thereof, coinciding with an axial line of the shaft 31.

The connection portions 46j are arranged in regions between two piece-shaped portions 46c, which are adjacent to each other in the circumferential direction, and present in a total of four positions. The connection portion 46j has a long plate shape extending in the circumferential direction. In the connection portion 46j, the two piece-shaped portions 46c adjacent to each other in the circumferential direction are connected. The two piece-shaped portions 46c adjacent to each other in the circumferential direction are connected to the connection portion 46j at a position corresponding to one of the piece-shaped portion peripheral end surfaces facing each other. The single piece-shaped portion peripheral end surface 46g faces other piece-shaped portions 46c adjacent thereto in the circumferential direction.

The connecting portions 46k are arranged in regions between the base portion 46a and the piece-shaped portions 46c with respect to the radial direction. The connecting portions 46k are arranged in the circumferential direction at predetermined intervals. The connecting portion 46k is disposed in a region between the gap portions 46b adjacent to each other in the circumferential direction. The connecting portion 46k has a long plate shape extending in the radial direction.

The connecting portion 46k connects an end portion in the circumferential direction at one side of the two piece-shaped portions 46c, which are connected to each other to the base portion 46a, at connecting portions of two piece-shaped portions 46c adjacent to each other. As shown in FIG. 17, the two piece-shaped portions 46c and the connecting portions 46k which are connected to each other have a shape having a T-shaped cross section perpendicular to the axial direction.

In the rotor core 40 shown in FIGS. 16 and 17, the plurality of connection magnetic steel plates 46 with the above configuration are laminated in the axial direction.

With the above configuration, it is possible to appropriately maintain a position of the magnet 32 in the circumferential direction even when a rotation direction of the rotor 3 is set to either forward rotation or reverse rotation. Further, since an amount of an iron material used as the connecting portions 46k is relatively small, it can be expected that a leakage magnetic flux is suppressed.

Further, in the rotor core 40, a first laminate 40X on an upper side and a second laminate 40Y on a lower side are laminated. In each of the first laminate 40X and the second laminate 40Y, a plurality of connection magnetic steel plates 46 with the connection portion 46j and the connecting portion 46k overlap each other to be laminated. The first laminate 40X and the second laminate 40Y are laminated so as to deviate in the circumferential direction at an angle of 45° corresponding to one piece-shaped portion 46c.

With the above configuration, since the rotor core 40 is formed by laminating the first laminate 40X and the second laminate 40Y in which a plurality of connection magnetic steel plates 46 having the same shape are laminated, the formation of the rotor 3 is facilitated. Further, since a punching direction and a laminating direction of the magnetic steel plate may be made the same in the manufacturing process, it is possible to provide the rotor 3 with good assemblability.

Further, the rotor core 40 may be configured by laminating three or more laminates in which a plurality of connection magnetic steel plates 46 are laminated.

Figure 18:
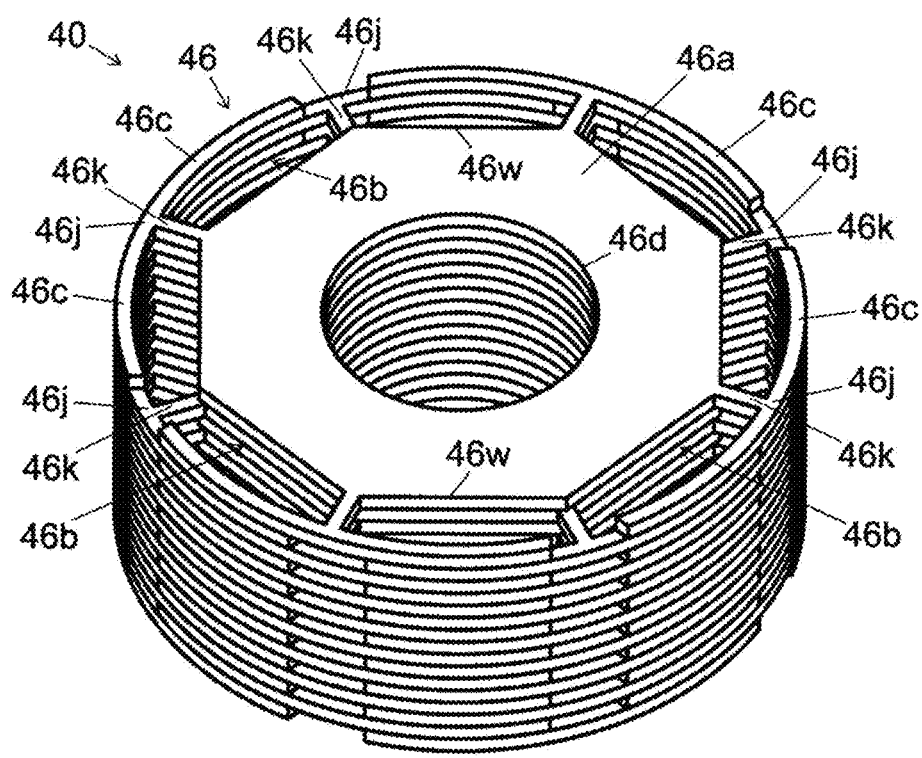
FIG. 18 is a perspective view of a modification of the rotor core of the motor according to the fourth example embodiment of the present disclosure.

FIG. 18 is a perspective view of a modification of the rotor core of the motor according to the fourth example embodiment of the present disclosure. In the rotor core 40 shown in FIG. 18, the plurality of connection magnetic steel plates 46 are laminated so as to deviate one by one in the circumferential direction at an angle corresponding to one piece-shaped portion 46c. With the above configuration, since both end portions in the circumferential direction of the magnet 32 face the connecting portion 46k in the circumferential direction for each magnetic steel plate, it is possible to appropriately maintain a position of the magnet 32 in the circumferential direction. Further, since a punching direction and a laminating direction of the magnetic steel plate may be made the same in the manufacturing process, it is possible to provide the rotor 3 with good assemblability.

Further, the magnet may have any shape as long as a length of a central portion of the magnet is longer than a length of an end portion. For example, an outer side surface and an inner side surface of the magnet may be curved.

The present disclosure is applicable to, for example, a rotor core, a rotor, and a motor. Further, the motor of the present disclosure can be applied to, for example, in-vehicle parts such as an electric power steering, an electric oil pump, and a brake.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

I claim:

1. A rotor comprising:
a rotor core in which a plurality of magnetic steel plates widening in a radial direction with respect to a central axis of the rotor are laminated in an axial direction; and
a plurality of magnets attached to the rotor core; wherein
each of the magnetic steel plates includes a base portion positioned outside the central axis in the radial direction, and a plurality of piece-shaped portions which are each arranged to be spaced by a gap from an outer side in the radial direction of the base portion and are arranged in a circumferential direction of the base portion at predetermined intervals;
the plurality of magnets are positioned at the gaps and arranged in the circumferential direction at predetermined intervals;
a length in the radial direction from a central portion of each of the plurality of magnets in the circumferential direction is a central portion length in a cross-section perpendicular to the axial direction;
a length in the radial direction from an end portion of each of the plurality of magnets in the circumferential direction is an end portion length;
the central portion length and the end portion length are lengths in parallel or substantially in parallel;
the central portion length is greater than the end portion length;
each of the plurality of piece-shaped portions includes:
an outer peripheral surface; and
the piece-shaped portion inner side surface facing one of the plurality of magnets;
the outer peripheral surface is a curved surface;
the piece-shaped portion inner side is a curved surface; and
a radius of curvature of the outer peripheral surface is smaller than a radius of curvature of the piece-shaped portion inner side surface.

2. The rotor of claim 1, wherein each of the magnets includes:
an outer side surface facing the piece-shaped portion;
an inner side surface facing the base portion; and
two peripheral end surfaces facing two other magnets adjacent thereto in the circumferential direction; wherein
the outer side surface is a curved surface;
the inner side surface is a flat surface; and
the two peripheral end surfaces are flat surfaces and are in parallel or substantially in parallel.

3. The rotor of claim 1, wherein
the piece-shaped portion includes two piece-shaped portion peripheral end surfaces which face two other piece-shaped portions adjacent to each other in the circumferential direction; and
the two piece-shaped portion peripheral end surfaces are flat surfaces and are in parallel or substantially in parallel.

4. The rotor of claim 1, wherein, in an angle region between ones of the piece-shaped portions adjacent to each other in the circumferential direction with respect to the central axis, the base portion includes a concave portion recessed inward from an outer side edge portion of the base portion in the radial direction.

5. The rotor of claim 1, further comprising a resin to fix the magnet and the piece-shaped portions to the outer side in the radial direction of the base portion.

6. The rotor of claim 1, wherein each of the plurality of magnetic steel plates includes:
a first connecting portion that connects two of the piece-shaped portions adjacent to each other in the circumferential direction; and
a second connecting portion that connects the base portion to the first connecting portion.

7. The rotor of claim 6, wherein two laminates, in which the plurality of magnetic steel plates with the first connecting portion and the second connecting portion overlap each other to be laminated, are laminated so as to deviate in the circumferential direction at an angle corresponding to one of the piece-shaped portions.

8. The rotor of claim 6, wherein the plurality of magnetic steel plates are laminated to deviate one by one in the circumferential direction at an angle corresponding to one of the piece-shaped portions.

9. The rotor of claim 1, wherein at least one of the plurality of magnetic steel plates includes:
a first connecting portion that connects the piece-shaped portions adjacent to each other in the circumferential direction; and
a second connecting portion that connects the base portion to the connection portion; wherein
the rotor core includes a lamination of the magnetic steel plate without the first connecting portion and the second connecting portion and the magnetic steel plate including the first connecting portion and the second connecting portion.

10. The rotor of claim 1, wherein
each of the magnetic steel plates includes a connecting portion that connects an end portion in the circumferential direction of one side of the piece-shaped portion to the base portion;
at least a first one of the plurality of magnetic steel plates includes the connecting portion at a first end side in the circumferential direction of the piece-shaped portion; and
at least a second one of the plurality of magnetic steel plates includes the connecting portion at a second end side in the circumferential direction of the piece-shaped portion.

11. The rotor of claim 10, wherein a first laminate, in which the plurality of magnetic steel plates including the connecting portion at the first end side in the circumferential direction of the piece-shaped portion, and a second laminate, in which the plurality of magnetic steel plates including the connecting portion at the second end side in the circumferential direction of the piece-shaped portion, are laminated.

12. The rotor of claim 10, wherein the magnetic steel plate including the connecting portion at the first end side in the circumferential direction of the piece-shaped portion and the magnetic steel plate including the connecting portion at the second end side in the circumferential direction of the piece-shaped portion are alternately laminated.

13. A motor comprising the rotor according to claim 1.

* * * * *